(12) United States Patent
Hagimori

(10) Patent No.: US 10,173,418 B2
(45) Date of Patent: Jan. 8, 2019

(54) TRANSFER DATA GENERATOR, PRINTING DEVICE, AND TRANSFER DATA CREATION METHOD

(71) Applicant: Roland DG Corporation, Hamamatsu-shi, Shizuoka (JP)

(72) Inventor: Hiro Hagimori, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 0 days.

(21) Appl. No.: 15/672,362

(22) Filed: Aug. 9, 2017

(65) Prior Publication Data

US 2018/0043684 A1    Feb. 15, 2018

(30) Foreign Application Priority Data

Aug. 10, 2016    (JP) .................. 2016-157194

(51) Int. Cl.

| G06F 1/08 | (2006.01) |
| B41J 2/045 | (2006.01) |
| G06K 15/02 | (2006.01) |
| G06K 15/10 | (2006.01) |
| B41J 2/01 | (2006.01) |

(52) U.S. Cl.
CPC ....... *B41J 2/04541* (2013.01); *B41J 2/04548* (2013.01); *G06F 1/08* (2013.01); *G06K 15/027* (2013.01); *G06K 15/102* (2013.01); *B41J 2/01* (2013.01)

(58) Field of Classification Search
CPC ...... B41J 2/04541; B41J 2/04548; B41J 2/01; G06F 1/08; G06K 15/102; G06K 15/027
See application file for complete search history.

(56) References Cited

U.S. PATENT DOCUMENTS

2001/0027534 A1* 10/2001 Sato .................. G06F 1/10
                                                      713/501
2009/0109269 A1* 4/2009 Rufes .................. B41J 11/002
                                                      347/102

FOREIGN PATENT DOCUMENTS

JP    2008-279616 A    11/2008

* cited by examiner

*Primary Examiner* — Yaovi M Ameh
(74) *Attorney, Agent, or Firm* — Keating & Bennett, LLP

(57) ABSTRACT

A transfer data generator creates transfer data that suppresses an increase in radiation noise generated when the transfer data is transferred to an ink head. The transfer data generator creates transfer data including transfer printing image data to be transferred to the ink head, and a transfer clock signal. The transfer data generator includes a clock signal creation processor that generates a pulse period of at least one pulse of a plurality of pulses of the reference clock signal different from each of pulse periods of the other pulses to generate the transfer clock signal from the reference clock signal, and a printing image data creation processor that adjusts the reference printing image data so as to correspond to the transfer clock signal to generate transfer printing image data.

11 Claims, 7 Drawing Sheets

TRANSFER DATA GENERATOR, PRINTING DEVICE, AND TRANSFER DATA CREATION METHOD

CROSS REFERENCE TO RELATED APPLICATION

This application claims the benefit of priority to Japanese Patent Application No. 2016-157194 filed on Aug. 10, 2016. The entire contents of this application are hereby incorporated herein by reference.

BACKGROUND OF THE INVENTION

1. Field of the Invention

The present invention relates to a transfer data generator, a printing device, and a transfer data creation method; and more specifically, a transfer data generator that creates transfer data that is to be transferred to an ink head and includes a clock signal and printing image data corresponding to the clock signal, a printing device including such a transfer data generator, and a transfer data creation method.

2. Description of the Related Art

Conventionally, an inkjet printing device, including a platen on which a recording medium is to be placed, an ink head ejecting ink toward the recording medium, and a controller electrically connected with the ink head via a cable, is known. In this type of printing device, transfer data is transferred from the controller toward the ink head. The transfer data includes, for example, a clock signal and printing image data that is raster data converted from a printing image, which is a printing target.

For transferring the transfer data to the ink head, a high-level electric current flows in the cable connecting the ink head and the controller to each other. As a result, the cable acts as an antenna and thus may generate radiation noise. The radiation noise is a factor causing malfunction to devices located in the vicinity of the printing device.

For example, Japanese Laid-Open Patent Publication No. 2008-279616 discloses a recording device provided to suppress generation of radiation noise. With this recording device, a nozzle array included in each of a plurality of ink heads is divided into a plurality of groups, and clock signals of different frequencies are respectively generated for the groups. Such an arrangement significantly suppresses an increase in the level of the radiation noise.

However, the above-described recording device generates a specific frequency in each of the divided groups. Therefore, radiation noise is conspicuously generated at such a specific frequency in each of the groups.

SUMMARY OF THE INVENTION

Preferred embodiments of the present invention provide transfer data generators that create transfer data that significantly reduces or prevents an increase in radiation noise generated when the transfer data is transferred to an ink head, printing devices each including such a transfer data generator, and transfer data creation methods.

A transfer data generator according to a preferred embodiment of the present invention creates transfer data in a printing device. The printing device includes a platen allowing a recording medium to be placed thereon, and an ink head ejecting ink toward the recording medium placed on the platen. The transfer data includes transfer printing image data to be transferred to the ink head, and a transfer clock signal to be transferred to the ink head. The transfer data generator includes a storage processor having, stored thereon, a reference clock signal including a plurality of pulses with pulse periods of the same length as each other, and reference printing image data corresponding to the reference clock signal, a clock signal creation processor making a pulse period of at least one pulse of the plurality of pulses of the reference clock signal different from each of pulse periods of the other pulses, and thus creating the transfer clock signal from the reference clock signal, and a printing image data creation processor adjusting the reference printing image data so as to correspond to the transfer clock signal created by the clock signal creation processor, and thus creating the transfer printing image data.

According to the transfer data generator, at least a portion of the pulse periods of the transfer clock signal to be transferred to the ink head is different from the other pulse periods. Therefore, the transfer clock signal has no specific frequency. This disperses the generation of the radiation noise, and thus significantly reduces or prevents an increase in the level of the radiation noise at a specific frequency. According to the transfer data generator, a transfer clock signal significantly reducing or preventing an increase in the level of the generated radiation noise is created.

A transfer data creation method according to a preferred embodiment of the present invention creates transfer data in a printing device. The printing device includes a platen allowing a recording medium to be placed thereon, and an ink head ejecting ink toward the recording medium placed on the platen. The transfer data includes transfer printing image data to be transferred to the ink head, and a transfer clock signal to be transferred to the ink head. The transfer data creation method includes a preparation step of preparing a reference clock signal including a plurality of pulses with pulse periods of the same length as each other, and reference printing image data corresponding to the reference clock signal; a time division step of dividing the reference clock signal with a predetermined first period, thus dividing the reference clock signal into a plurality of divided clocks; a clock signal creation step of, in the case of selecting a first selected divided clock from the plurality of divided clocks obtained in the time division step, deleting the first selected divided clock, thus creating the transfer clock signal from the reference clock signal; and a printing image data creation step of adjusting the reference printing image data so as to correspond to the transfer clock signal created in the clock signal creation step, thus the creating the transfer printing image data.

According to the transfer data creation method, time division is performed on the reference clock signal with the predetermined first period to divide the reference clock signal into a plurality of divided clocks. A portion of the plurality of divided clocks is deleted to make a portion of the pulse periods different from the other pulse periods. Thus, a transfer clock signal having no specific frequency is created. Such a transfer clock signal having no specific frequency disperses the generation of the radiation noise. According to the transfer data creation method, a transfer clock signal dispersing the generation of the radiation noise to significantly reduce or prevent an increase in the generated radiation noise is created.

According to various preferred embodiments of the present invention, transfer data that significantly reduces or prevents an increase in radiation noise generated when the transfer data is transferred to an ink head is created.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, printing devices and methods according to preferred embodiments of the present invention will be described with reference to the drawings. The preferred embodiments described herein do not limit the present invention in any way. Components, portions or steps having the same functions will bear the same reference signs, and overlapping descriptions will be omitted or simplified.

Figure 1:
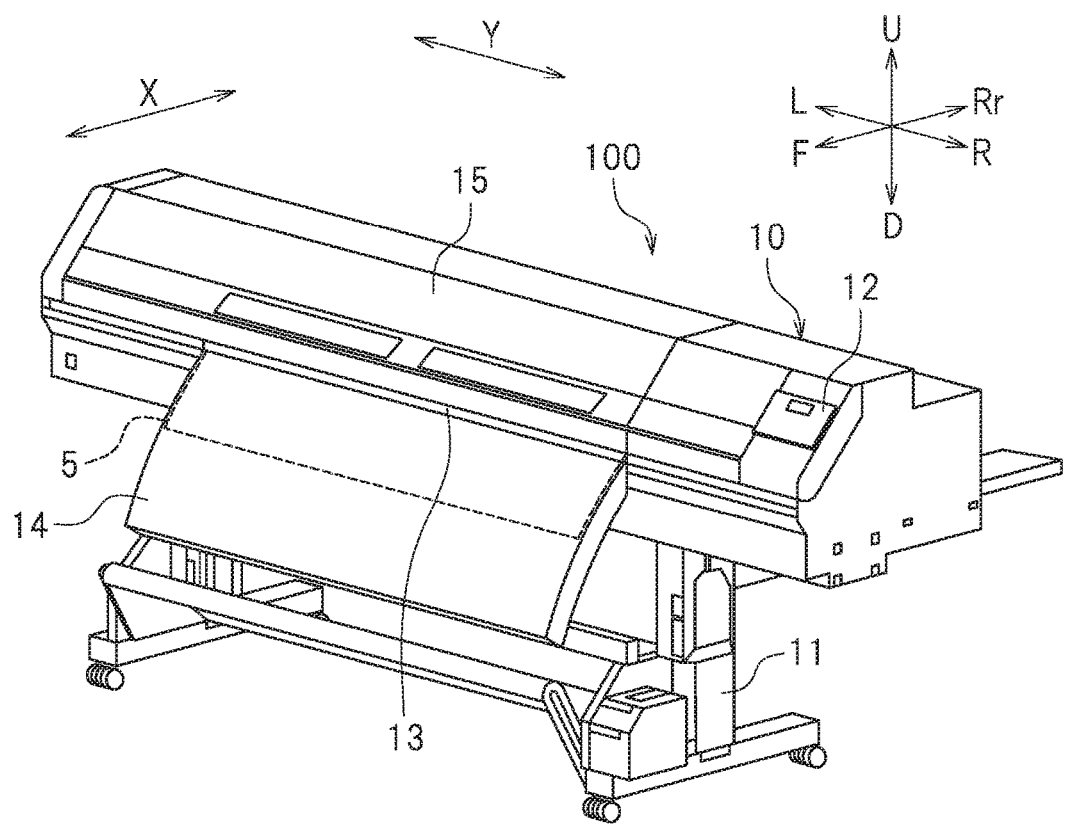
FIG. 1 is a perspective view showing a printing device according to a preferred embodiment according to the present invention.

FIG. 1 is a perspective view of a printing device 100 according to a preferred embodiment of the present invention. In the following description, the terms "left", "right", "up" and "down" respectively refer to left, right, up and down as seen from a person facing a front surface of the printing device 100. The term "front" refers to the side closer to a person looking at the printing device 100 in FIG. 1, and the term "rear" refers to the side farther from the person looking at the printing device 100 in FIG. 1. In the drawings, the letters F, Rr, L, R, U an D respectively refer to front, rear, left, right, up and down. These directions are defined merely for the sake of convenience, and do not limit the manner of installation of the printing device 100 in any way. In the drawings, the letter "Y" refers to a main scanning direction. Herein, the main scanning direction Y is the left-right direction. The letter "X" refers to a sub scanning direction. Herein, the sub scanning direction X is the front-rear direction. The sub scanning direction X is perpendicular to the main scanning direction Y as seen in a plan view. The main scanning direction Y and the sub scanning direction X are not specifically limited to any specific directions and may be set appropriately in accordance with the printing device 100.

Referring to FIG. 1, the printing device 100 preferably is an inkjet printer, for example. The printing device 100 performs printing on a recording medium 5. Herein, the recording medium 5 is rolled recording paper. Alternatively, the recording medium 5 may be sheet recording paper. The recording medium 5 may be a resin sheet. The recording medium 5 is not limited to being a flexible sheet. The recording medium 5 may be a medium formed of a hard material such as glass or the like.

In this preferred embodiment, the printing device 100 includes a main body 10 including a casing, legs 11 provided on a bottom surface of the main body 10, an operation panel 12 allowing a user to make an operation on printing, and a cover 15 provided on a top surface of the main body 10. The printing device 100 is provided with a discharge opening 13, through which the recording medium 5 is discharged. The discharge opening 13 is provided at a position below the cover 15 and in a front part of the main body 10. The printing device 10 also includes a guide 14 that guides the recording medium 5 discharged from the discharge opening 13. The guide 14 is provided at a position to the front of, and below, the discharge opening 13.

Figure 2:
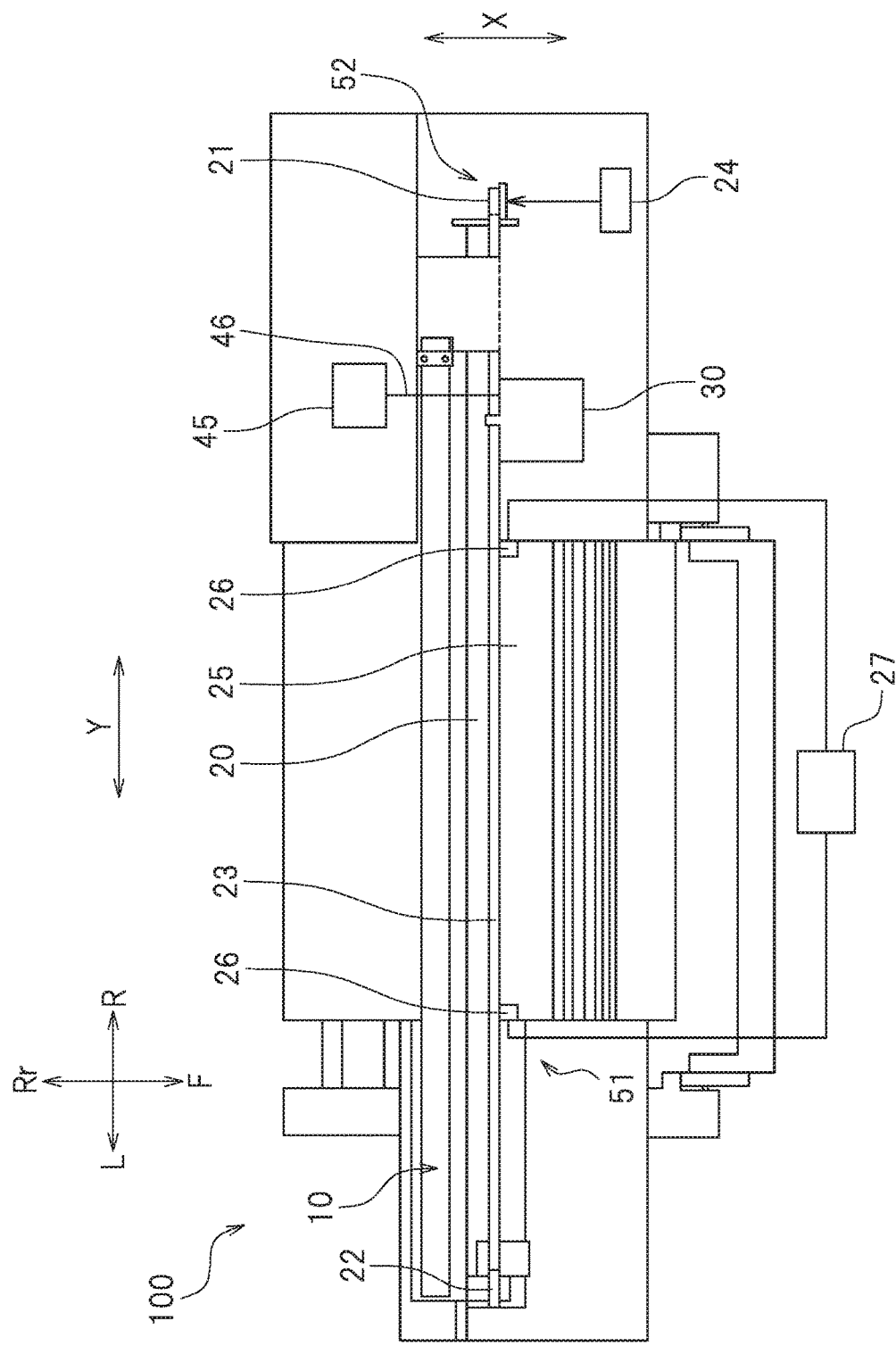
FIG. 2 is a plan view showing an internal structure of the printing device.
Figure 3:
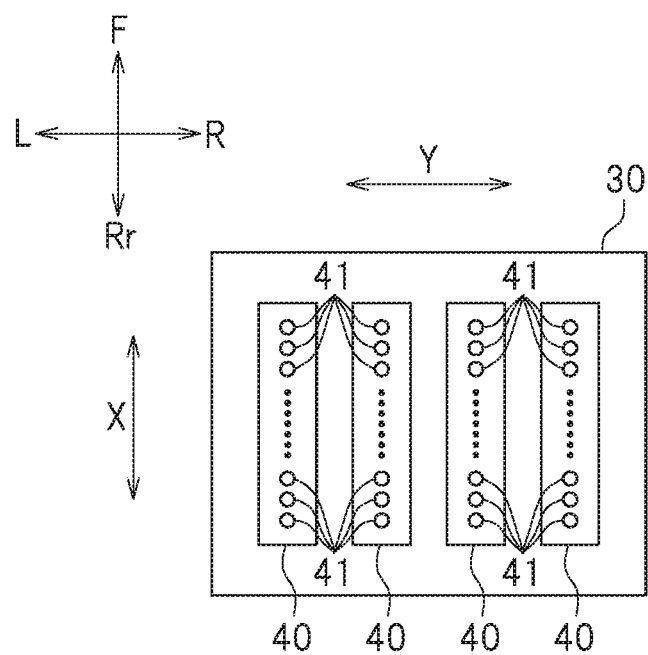
FIG. 3 is a bottom view of ink heads.
Figure 4:
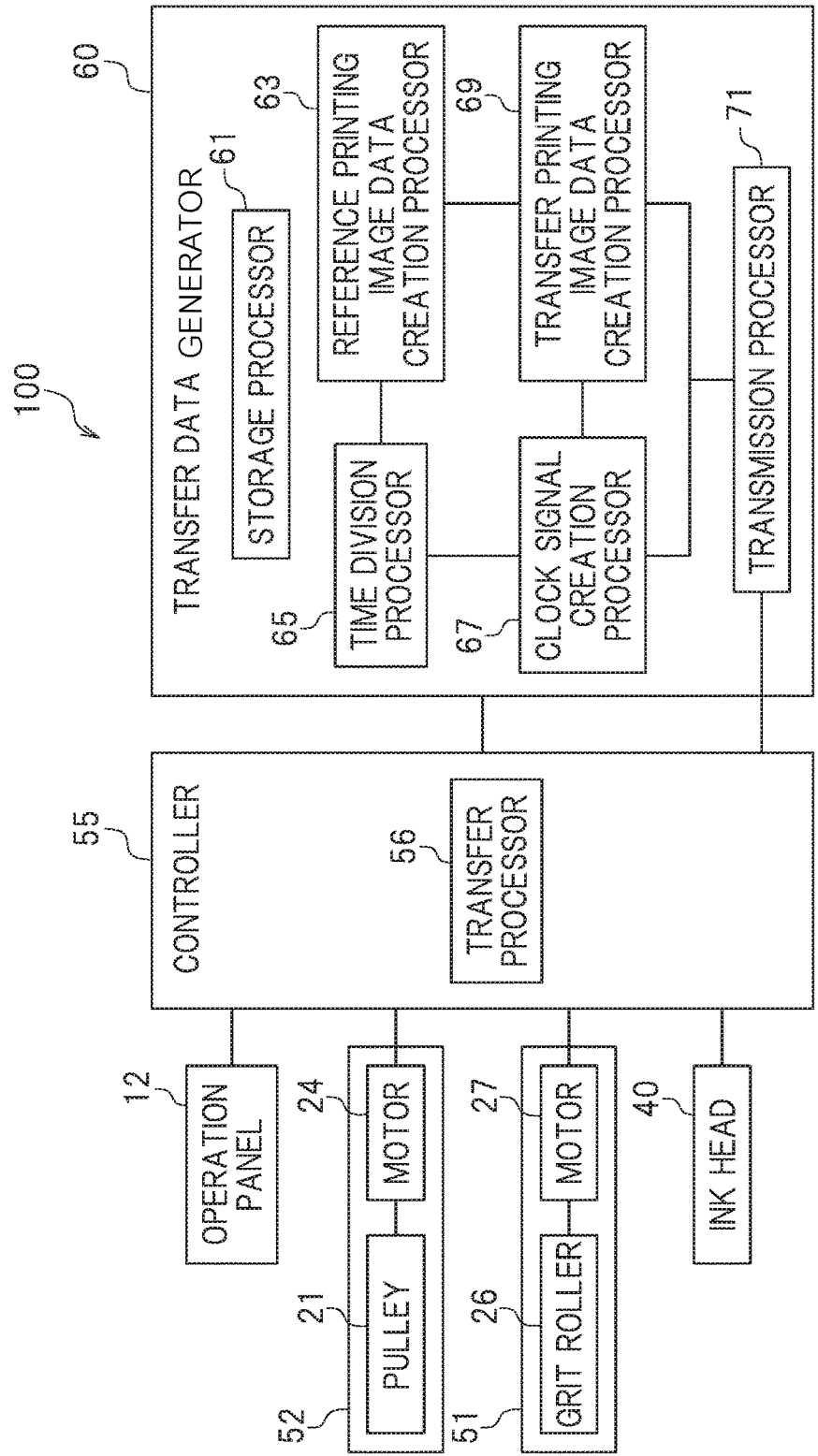
FIG. 4 is a block diagram of the printing device.

FIG. 2 is a plan view showing an internal structure of the printing device 100. FIG. 3 is a bottom view of ink heads 40. FIG. 4 is a block diagram of the printing device 100. As shown in FIG. 2, the printing device 100 includes a guide rail 20, a platen 25, a first movement mechanism 51, a second movement mechanism 52, a carriage 30, the ink heads 40 (see FIG. 3), a controller 55 (see FIG. 4), and a transfer data generator 60 (see FIG. 4). The guide rail 20 is located below the cover 15 (see FIG. 1). The guide rail 20 extends in the main scanning direction Y.

The platen 25 supports the recording medium 5 while printing is performed on the recording medium 5. The platen 25 allows the recording medium 5 to be placed thereon. Printing on the recording medium 5 is performed on the platen 25. In this preferred embodiment, the platen 25 extends in the main scanning direction Y, and is located below a central portion of the guide rail 20. The platen 25 is continued from the guide 14 (see FIG. 1).

In this preferred embodiment, the platen 25 preferably has, for example, a length of about 20 cm or greater in the main scanning direction Y (herein, the left-right direction). For example, the length of the platen 25 in the main scanning direction Y is greater than, or equal to, the length of the shorter side of an A0-size paper sheet. The A0-size paper sheet has a size of 841 mm×1189 mm. The shorter side of the A0-size paper sheet preferably is, for example, about 841 mm long. The length of the platen 25 in the main scanning direction Y is greater than, or equal to, the length of the longer side of an A1-size paper sheet. The length of the longer side of the A1-size paper sheet is the same as the length of the shorter side of the A0-size paper sheet. The length of the platen 25 in the main scanning direction Y is greater than, or equal to, the length of the shorter side of a B1-size paper sheet. The shorter side of the B1-size paper sheet is 728 mm long. In this preferred embodiment, the main body 10 of the printing device 100 has a length in the main scanning direction Y that is longer than the length of an arm of a user. The length of the main body 10 in the main scanning direction Y is longer than the distance from the eye of the user to the tip of a finger of his/her arm in a state where the user extends the arm in the main scanning direction Y. The printing device 100 is longer than a home-use printer in the main scanning direction Y. The printing device 100 is a so-called large-scale printer.

The first movement mechanism 51 is a mechanism moving the recording medium 5, placed on the platen 25, in the sub scanning direction X toward the ink heads 40 (see FIG. 3) (e.g., moving the recording medium 5 from the rear to the front). In this preferred embodiment, the first movement mechanism 51 includes a pair of rollers 26 (top and bottom rollers) and a motor 27. FIG. 2 shows only the top roller 26 and omits the bottom roller 26. There is no specific limitation on the number and the locations of the pair of rollers 26. Herein, one of the pair of rollers 26 is a driving roller drivable by the motor 27 (the one of the pair of roller 26 is also referred to as a "grit roller"). The grit roller 26 is connected with the motor 27. The other of the pair of rollers 26 is a pinch roller holding the recording medium 5 together with the grit roller 26. The pinch roller 26 is movable upward and downward.

The second movement mechanism 52 is a mechanism moving the ink heads 40 (see FIG. 3) in the main scanning direction Y with respect to the recording medium 5 placed on the platen 25. In this preferred embodiment, the second movement mechanism 52 includes a pulley 21, a pulley 22, a belt 23, and a motor 24. The pulley 21 is located at a right end of the guide rail 20. The pulley 22 is located at a left end of the guide rail 20. The belt 23 is extended between, and along, the pulley 21 and the pulley 22. In this preferred embodiment, the belt 23 is endless. The belt 23 is not limited to being an endless belt. For example, the belt 23 may not be endless and may have both of two ends thereof secured to the pulley 21 and the pulley 22. Herein, the motor 24 is connected with the pulley 21. Alternatively, the motor 24 may be connected with the pulley 22. The motor 24 is driven to drive the pulley 21, and as a result, the belt 23 runs between the pulley 21 and the pulley 22. The second movement mechanism 52 does not need to include any of the pulley 21, the pulley 22 and the belt 23. For example, the second movement mechanism 52 may include a shaft, a first gear provided on the shaft, a second gear engageable with the first gear, and the like. In this case, the shaft is connected with the motor 24, and the motor 24 is driven to rotate the first gear and the second gear. In this preferred embodiment, the second movement mechanism 52 corresponds to a "movement mechanism".

In this preferred embodiment, the carriage 30 is attached to the belt 23. Although not shown, the carriage 30 is in engagement with the guide rail 20. The carriage 30 is moved by the second movement mechanism 52 in the main scanning direction Y along the guide rail 20 as the belt 23 runs.

As shown in FIG. 3, the ink heads 40 eject ink toward the recording medium 5 placed on the platen 25. The ink heads 40 are mounted on the carriage 30. The ink heads 40 are located above the platen 25 (see FIG. 2), and is slidably in engagement with the guide rail 20 via the carriage 30. The ink heads 40 are movable in the main scanning direction Y along the guide rail 20 by the second movement mechanism 52. There is no specific limitation on the number of the ink heads 40. In this preferred embodiment, four ink heads 40 preferably are provided, for example. The four ink heads 40 are located in a line in the main scanning direction Y. The four ink heads 40 eject ink of different colors. For example, the four ink heads 40 respectively eject cyan ink, magenta ink, yellow ink and black ink. The ink heads 40 each include a plurality of nozzles 41 located in a line in the sub scanning direction X. The plurality of nozzles 41 are located in a bottom surface of each of the ink heads 40. The ink is ejected from the plurality of nozzles 41.

In this preferred embodiment, the ink heads 40 are connected with ink cartridges 45 (see FIG. 2). Herein, the ink heads 40 and the ink cartridges 45 are connected with each other via tubes 46 (see FIG. 2), respectively. The ink cartridges 45 each contain ink to be supplied to the corresponding ink head 40, namely, ink used for printing. There is no specific limitation on the location of the ink cartridges 45. Although not shown, the ink cartridges 45 may be detachably provided on, for example, the top surface of the main body 10. Although not shown, a pump, a dumper or the like may be provided between the ink cartridges 45 and the ink head 40 in order to control the pressure.

Now, the controller 55 will be described. Referring to FIG. 4, the controller 55 is a device performing control on printing. The controller 55 includes a microcomputer, and is provided inside the main body 10. The controller 55 includes a central processing unit (CPU), a ROM storing a program and the like to be executed by the CPU, a RAM and the like. Herein, the controller 55 performs control on printing by use of a program stored on the microcomputer.

In this preferred embodiment, the controller 55 is electrically connected with the operation panel 12, the motor 27 of the first movement mechanism 51, the motor 24 of the second movement mechanism 52, and the ink heads 40. The controller 55 separately controls the operation panel 12, the motor 27, the motor 24, and the ink heads 40. The controller 55 receives information on printing from the operation panel 12. The controller 55 controls the driving of the motor 27 of the first movement mechanism 51 to control the rotation of the grit roller 26. Thus, the controller 55 controls the movement, in the sub scanning direction X, of the recording medium 5 placed on the platen 25. The controller 55 controls the driving of the motor 24 of the second movement mechanism 52 to control the rotation of the pulley and the running of the belt 23 (see FIG. 2). Thus, the controller 55 controls the movement of the ink heads 40 in the main scanning direction Y. The controller 55 controls the timing at which the ink is ejected from the ink heads 40.

In this preferred embodiment, the controller 55 includes a transfer processor 56. The transfer processor 56 transfers a transfer clock signal CS2 (see FIG. 6) and transfer printing image data PD2 (see FIG. 6) to each of the ink heads 40 as described below.

In the printing device 100 in this preferred embodiment, printing image data and a clock signal are transferred to the ink head 40 for printing. The "printing image data" is data is obtained as a result of a printing image prepared as a printing target being converted into a format that is transferable to the ink heads 40. The "printed image data" is raster data. The "clock signal" is associated with the printing image data. The clock signal defines the timing at which ink is ejected from the nozzles 41 of the ink heads 40 based on the printing image data. In this preferred embodiment, the printing image data and the clock signal are collectively referred to as "transfer data". In this preferred embodiment, although not shown, the ink heads 40 each include a piezoelectric element converting an electric energy applied to the corresponding ink head 40 into a pressure. There is no specific limitation on the structure of the piezoelectric element. In this preferred embodiment, the printing image data and the clock signal are transferred to each of the ink heads 40, so that the ink head 40 is supplied with an electric energy. In the ink head 40, the level of the applied electric energy is changed when necessary to inflate or deflate the piezoelectric element, so that the electric energy is converted into a pressure. The ink head 40 ejects ink through the nozzles 41 based on a displacement caused by the inflation and the deflation of the piezoelectric element.

Figure 5:
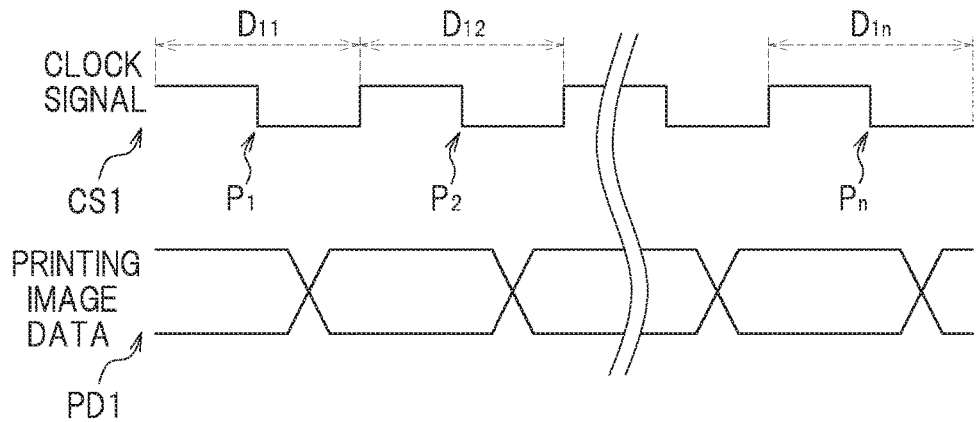
FIG. 5 is a timing diagram of printing image data and a clock signal.

FIG. 5 is a timing diagram of a printing image data PD1 and a clock signal CS1. As shown in FIG. 5, in the clock signal CS1, a plurality of pulses $P_1$, $P_2$, . . . , $P_n$ are continuous. The clock signal CS1 includes the plurality of pulses $P_1$, $P_2$, . . . , $P_n$. In FIG. 5, pulse periods $D_{11}$, $D_{12}$, . . . , $D_{1n}$ of the pulses $P_1$, $P_2$, . . . , $P_n$ have the same length as each other. The clock signal CS1 shown in FIG. 5 has a specific frequency.

Although not shown, the controller 55 (see FIG. 4) and the ink heads 40 (see FIG. 4) are connected with each other via cables such as flexible cables or the like. The printing image data PD1 and the clock signal CS1 are transferred to each of the ink heads 40 via such a cable. At this point, a high-level electric current flows in the cables. As a result, the cables act as antennas, and thus may generate radiation noise. Conventionally, in the clock signal CS1 shown in FIG. 5, the pulse periods $D_{11}, D_{12}, \ldots, D_{1n}$ of the pulses $P_1, P_2, \ldots, P_n$ have the same length as each other. Therefore, the clock signal CS1 has a specific frequency. For this reason, while the printing image data PD1 and the clock signal CS1 as shown in FIG. 5 are transferred to the ink head 40, radiation noise is conspicuously generated at a specific frequency. The radiation noise may undesirably cause malfunction of devices located in the vicinity of the printing device 100. In this preferred embodiment, the transfer data generator 60 creates transfer data (more specifically, printing image data and clock signal) that significantly reduces or prevents generation of the radiation noise.

Now, the transfer data generator 60 will be described. As shown in FIG. 4, the transfer data generator 60 is included in the printing device 100. The transfer data generator 60 is a device that creates transfer data including printing image data and a clock signal. The transfer data generator 60 includes a microcomputer, and is provided inside the main body 10. Alternatively, the transfer data generator 60 may be provided in a personal computer. The transfer data generator 60 includes a central processing unit (CPU), a ROM storing a program and the like to be executed by the CPU, a RAM and the like. Herein, the transfer data generator 60 creates transfer data by use of a program stored on the microcomputer.

In this preferred embodiment, the transfer data generator 60 is electrically connected with the controller 55. The transfer data generator 60 creates printing image data and a clock signal, and transmits the created printing image data and clock signal to the controller 55. In the case where the transfer data generator 60 is provided in a personal computer, the printing image data and the clock signal created by the transfer data generator 60 are transmitted to the controller 55 of the printing device 100 in a wired or wireless manner. Alternatively, in the case where the transfer data generator 60 is provided in a personal computer, the printing image data may be created by the personal computer whereas the clock signal may be created by the controller 55 of the printing device 100.

In this preferred embodiment, the transfer data generator 60 includes a storage processor 61, a reference printing image data creation processor 63, a time division processor 65, a clock signal creation processor 67, a transfer printing image data creation processor 69, and a transmission processor 71. In this preferred embodiment, the transfer printing image data creation processor 69 corresponds to the "printing image data creation processor". The above-listed processors may be realized by software or hardware. For example, the above-listed processors may each be realized by an independent processor. The above-listed processors may each be incorporated into a circuit.

Figure 6:
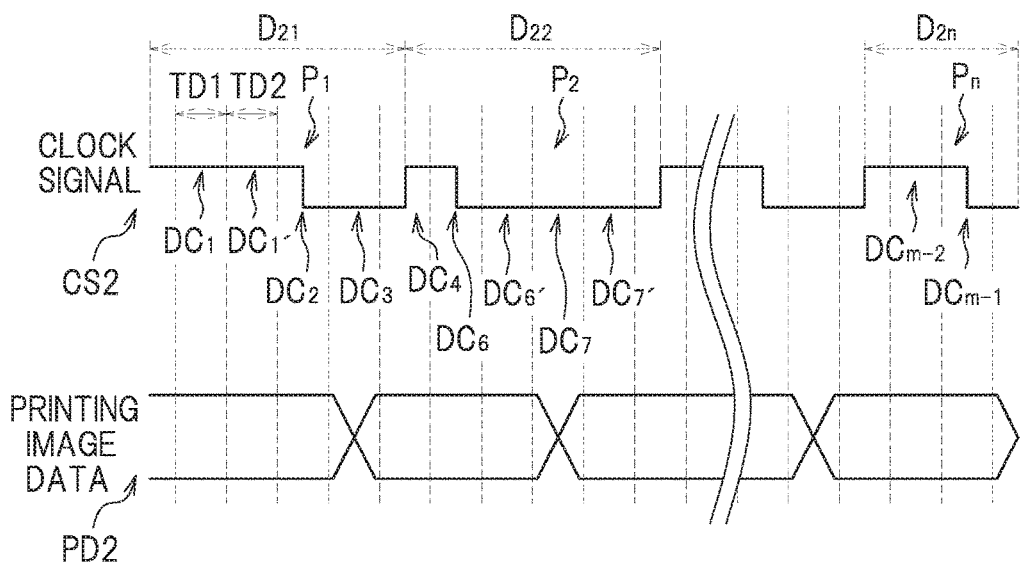
FIG. 6 is a timing diagram of transfer printing image data and a transfer clock signal to be transferred to the ink head.
Figure 7:
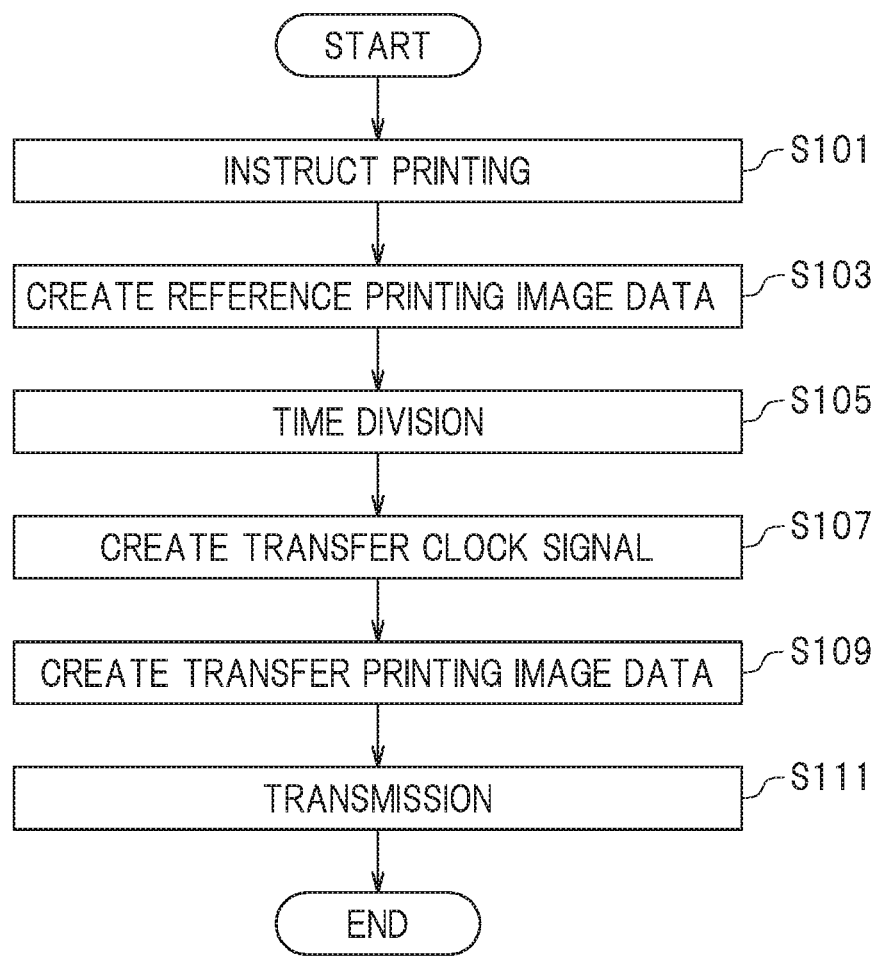
FIG. 7 is a flowchart showing a procedure of creating transfer data.

FIG. 6 is a timing diagram of printing image data PD2 and a clock signal CS2 transferred to the ink head 40. FIG. 7 is a flowchart showing a procedure of creating the transfer data in this preferred embodiment. Now, the procedure of creating the printing image data PD2 and the clock signal CS2 as shown in FIG. 6 will be described with reference to the flowchart shown in FIG. 7.

In the following description, the printing image data PD2 to be transferred to the ink head 40 will be referred to as "transfer printing image data". The clock signal CS2 to be transferred to the ink head 40 will be referred to as a "transfer clock signal". In this preferred embodiment, as shown in FIG. 6, the pulses $P_1, P_2, \ldots, P_n$ included in the transfer clock signal CS2 have pulse periods $D_{21}, D_{22}, \ldots, D_{2n}$. At least a portion of the pulse periods $D_{21}, D_{22}, \ldots, D_{2n}$ are different from the rest thereof. For example, in the transfer clock signal CS2 shown in FIG. 6, the pulse period $D_{2n}$ is different from each of the pulse periods $D_{21}$ and $D_{22}$. In this preferred embodiment, the frequency of the transfer clock signal CS2 to be transferred to the ink head 40 is randomly changed. In other words, the frequency of the transfer clock signal CS2 is not periodic.

Herein, the transfer clock signal CS2 and the transfer printing image data PD2 are respectively created from the clock signal CS1 and the printing image data PD1 shown in FIG. 5. Hereinafter, the clock signal CS1, based on which the transfer clock signal CS2 is created, will be referred to as a "reference clock signal". The printing image data PD1, based on which the transfer printing image data PD2 is created, will be referred to as "reference printing image data".

In this preferred embodiment, it is assumed that before the transfer clock signal CS2 and the transfer printing image data PD2 are created, the reference clock signal CS1 (see FIG. 5) having a specific frequency and a printing image that is a printing target are stored in advance on the storage processor 61.

Referring to FIG. 7, first in step S101, a user makes an instruction to print. For example, the user operates a printing start button (not shown) displayed on the operation panel 12 (see FIG. 1), and thus a printing job is transmitted from the operation panel 12 to the controller 55. The controller 55 receives the printing job and thus recognizes that the instruction to print was made. At this point, the controller 55 transmits, to the transfer data generator 60, an instruction signal to create transfer data. The transfer data generator 60 receives the instruction signal and thus starts creating the transfer clock signal CS2 and the transfer printing image data PD2 to be included in the transfer data.

Now, in step S103 in FIG. 7, the reference printing image data creation processor 63 creates the reference printing image data PD1 as shown in FIG. 5. Herein, the reference printing image data creation processor 63 creates the reference printing image data PD1, which is raster data, from the printing image stored on the storage processor 61. The reference printing image data PD1 is data based on which the transfer printing image data PD2 (see FIG. 6) to be transferred to each of the ink heads 40 is created. The reference printing image data PD1 created in step S103 is associated with the reference clock signal CS1 having a specific frequency as shown in FIG. 5. In step S103, the created reference printing image data PD1 is stored on the storage processor 61.

Figure 8:
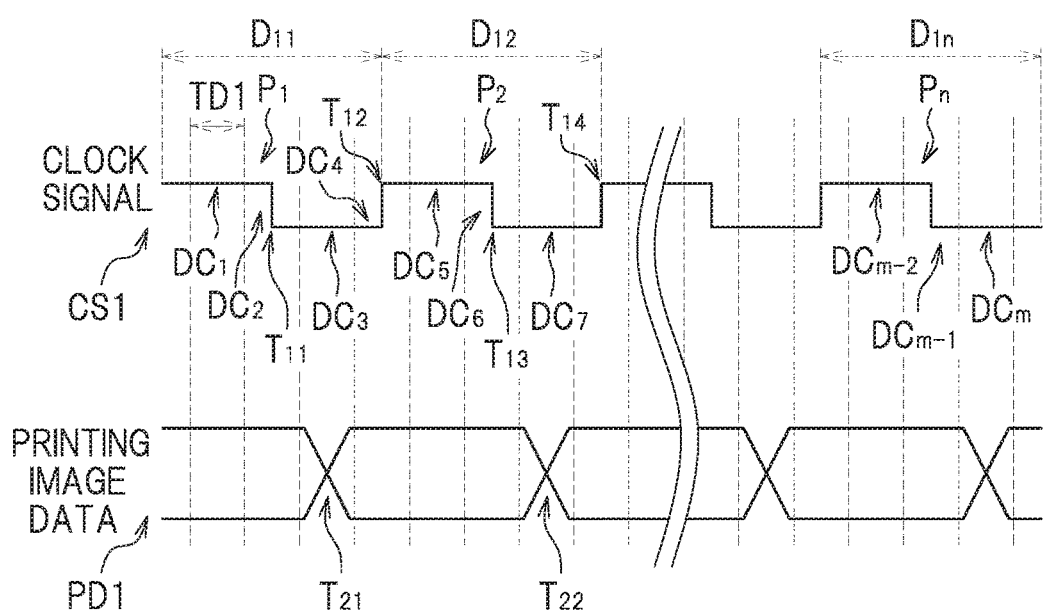
FIG. 8 is a timing diagram showing reference printing image data and a reference clock signal obtained by time division.

Next, in step S105 in FIG. 7, the time division processor 65 performs time division on the reference clock signal CS1 (see FIG. 5) and on the reference printing image data PD1 (see FIG. 5) associated with the reference clock signal CS1. FIG. 8 is a timing diagram showing the reference printing image data PD1 and the reference clock signal CS1 processed by the time-division. In this preferred embodiment, as shown in FIG. 8, the time division processor 65 performs time division on the reference clock signal CS1 and the reference printing image data PD1 shown in FIG. 5 with a predetermined first period TD1. The predetermined first period TD1 is a value stored in advance on the storage processor 61. The predetermined first period TD1 may be a constant value or may be changeable when necessary in accordance with the pulse periods $D_{11}, D_{12}, \ldots, D_{1n}$ of the reference clock signal CS1. As shown in FIG. 8, the first period TD1 is shorter than each of the pulse periods $D_{11}$, $D_{12}, \ldots, D_{1n}$ of the reference clock signal CS1. The first period TD1 is a value with which each of the reference printing image data PD1 and the reference clock signal CS1 is not processed by the time division at a timing when the level thereof is switched. Specifically, for example, the first period TD1 is set such that time division is not performed at time $T_{11}$ through $T_{14}$, $T_{21}$ or $T_{22}$.

In this preferred embodiment, post-time-division clock signals obtained as a result of the time division performed by the time division processor 65 are referred to as divided clocks $DC_1, DC_2, \ldots, DC_m$. Namely, the time division processor 65 performs the time division with the predetermined first period TD1 so as to divide the reference clock signal CS1 into the plurality of divided clocks $DC_1$, $DC_2, \ldots, DC_m$.

Next, in step S107 in FIG. 7, the clock signal creation processor 67 creates the transfer clock signal CS2 (see FIG. 6) to be transferred to each of the ink heads 40. Specifically, the clock signal creation processor 67 selects one of the divided clocks $DC_1, DC_2, \ldots, DC_m$ obtained by the time division processor 65 in step S105. The clock signal creation processor 67 randomly performs either one of a process A, a process B and a process C described below on the selected divided clock.

Process A: delete the selected divided clock
Process B: insert a new divided clock after the selected divided clock
Process C: perform neither process A nor process B Herein, the process A is performed as follows, for example. Referring to FIG. 8, the clock signal creation processor selects the divided clock $DC_m$. The clock signal creation processor 67 determines whether or not the selected divided clock $DC_m$ and a portion of the reference printing image data PD1 that corresponds to the selected divided clock $DC_m$ each have a portion in which the level is switched. In the case where there is no portion in which the level is switched, the clock signal creation processor 67 deletes the selected divided clock $DC_m$ as shown in FIG. 6. As a result, the pulse period of the pulse $P_n$, to which the deleted divided clock $DC_m$ belongs, is changed from $D_{1n}$ (see FIG. 8) to $D_{2n}$.

Now, it is assumed that, for example, the clock signal creation processor 67 selects the divided clock $DC_4$. The level of the divided clock $DC_4$ is switched at time $T_{12}$. In this case, the clock signal creation processor 67 determines that the divided clock $DC_4$ cannot be deleted and does not perform the process A on the divided clock $DC_4$. Similarly, it is assumed that, for example, the clock signal creation processor 67 selects the divided clock $DC_3$. The level of a portion of the reference printing image data PD1 that corresponds to the divided clock $DC_3$ is switched at time $T_{21}$. Therefore, the clock signal creation processor 67 determines that the divided clock $DC_3$ cannot be deleted and does not perform the process A on the divided clock $DC_3$. In this preferred embodiment, the divided clock selected in the process A corresponds to the "first selected divided clock."

The process B is performed as follows, for example. Referring to FIG. 8, the clock signal creation processor 67 selects the divided clock $DC_1$. As shown in FIG. 6, the clock signal creation processor 67 inserts a new divided clock $DC_{1'}$ immediate after the selected divided clock $DC_1$. As a result, the pulse period of the pulse $P_1$, to which the selected divided clock $DC_1$ belongs, is changed from $D_{11}$ (see FIG. 8) to $D_{21}$. The new divided clock $DC_{1'}$ is a clock with which the level at the rear end of the selected divided clock $DC_1$ is kept for a predetermined second period TD2. In other words, in the process B, the clock signal creation processor 67 extends the selected divided clock $DC_1$ such that the level at the rear end of the selected divided clock $DC_1$ is kept for the predetermined second period TD2. The second period TD2 is stored in advance on the storage processor 61. There is no specific limitation on the value of the second period TD2. Herein, the second period TD2 has the same length as that of the first period TD1 (see FIG. 8).

In FIG. 6, the clock signal creation processor 67 also selects the divided clock $DC_6$ and the divided clock $DC_7$. The clock signal creation processor 67 inserts a new divided clock $DC_{6'}$ immediately after the selected divided clock $DC_6$ and inserts a new divided clock $DC_{7'}$ immediately after the selected divided clock $DC_7$. In this preferred embodiment, the clock selected in the process B corresponds to the "second selected divided clock."

The process C is performed as follows, for example. Referring to FIG. 8, the clock signal creation processor 67 selects the divided clock $DC_3$. The clock signal creation processor 67 performs neither the process A nor the process B on the selected divided clock $DC_3$. Namely, in the process C, the clock signal creation processor 67 does not perform any process on the selected divided clock $DC_3$. In this preferred embodiment, the clock selected in the process C corresponds to the "third selected divided clock."

In this preferred embodiment, in step S107, the clock signal creation processor 67 randomly performs either one of the process A, the process B and the process C on the divided clocks obtained by the time division. Either one of the process A, the process B and the process C may be performed continuously for continuous divided clocks. For example, as shown in FIG. 8, the process B is performed on the continuous divided clocks $DC_6$ and $DC_7$.

In step S107 in FIG. 7, the clock signal creation processor 67 creates the transfer clock signal CS2 as shown in FIG. 6. After this, in step S109, the transfer printing image data creation processor 69 creates the transfer printing image data PD2 shown in FIG. 6 from the reference printing image data PD1 shown in FIG. 5, such that the transfer printing image data PD2 corresponds to the transfer clock signal CS1 created in step S107. Herein, the transfer printing image data creation processor 69 shortens the rate for portions of the reference printing image data PD1 that correspond to the divided clocks $DC_5$ and $DC_m$, on which the process A was performed. The transfer printing image data creation processor 69 extends the rate for portions of the reference printing image data PD1 that correspond to the divided clocks $DC_1$, $DC_6$ and $DC_7$, on which the process B was performed. The transfer printing image data creation processor 69 does not perform any process on portions of the reference printing image data PD1 that correspond the clocks on which the process C was performed. In this manner, as shown in FIG. 6, the rate of the reference printing image data PD1 is adjusted so as to correspond to the transfer clock signal CS2. Thus, the transfer printing image data PD2 is created.

Next, in step S111, the transmission processor 71 transmits, to the controller 55 (see FIG. 4), the transfer clock signal CS2 (see FIG. 6) created by the clock signal creation processor 67 in step S107 and the transfer printing image data PD2 (see FIG. 6) created by the transfer printing image data creation processor 69 in step S109. After the controller 55 receives the transfer clock signal CS2 and the transfer printing image data PD2, the transfer processor 56 of the controller 55 transfers the transfer clock signal CS2 and the transfer printing image data PD2 to the ink head 40. The ink head 40 ejects ink toward the recording medium 5 placed on the platen 25 based on the transfer clock signal CS2 and the transfer printing image data PD2 that have been transferred to the ink head 40. The transmission processor 71 may transfer the transfer clock signal CS2 and the transfer printing image data PD2 directly to the ink head 40 without transmission thereof to the controller 55.

In this preferred embodiment, as shown in FIG. 3, there are four ink heads 40, for example. Therefore, the transfer clock signal CS2 and the transfer printing image data PD2 are created for each of the plurality of (for example, four in this preferred embodiment) ink heads 40. Namely, the processes performed in steps S103 through S109 shown in FIG. 7 are performed for each of the ink heads 40. The pulse periods $D_{21}, D_{22}, \ldots, D_{2n}$ of the pulses $P_1, P_2, \ldots, P_n$ may be different among the transfer clock signals CS2 transferred to the ink heads 40.

As described above, in this preferred embodiment, as shown in FIG. 6, the clock signal creation processor 67 makes at least one of the pulse periods of the plurality of pulses $P_1, P_2, \ldots, P_n$ of the reference clock signal CS1 (see FIG. 5) different from the other pulse periods, and thus creates the transfer clock signal CS2 from the reference clock signal CS1. Therefore, the transfer clock signal CS2 does not any specific frequency. This disperses the generation of the radiation noise. This significantly reduces or prevents an increase in the level of the radiation noise at a specific frequency. For this reason, in this preferred embodiment, the transfer clock signal CS2 that significantly reduces or prevents an increase in the level of the generated radiation noise is created.

A printing device with which the level of the radiation noise is increased needs to include a mechanism that prevents the radiation noise from leaking outside. Therefore, such a printing device with which the level of the radiation noise is increased needs to have a larger number of components and needs to be of a larger scale. This increases the scale of the motor used or the like, and also increases the power consumption. By contrast, in this preferred embodiment of the present invention, the transfer clock signal CS2 that significantly reduces or prevents an increase in the level of the radiation noise is created. Therefore, as compared with the printing device with which the level of the radiation noise is increased, the printing device 100 in this preferred embodiment is prevented from being enlarged and also from consuming a high level of power.

In this preferred embodiment, as shown in FIG. 8, the time division processor 65 performs time division on the reference clock signal CS1 with the first period TD1, and thus divides the reference clock signal CS1 into the plurality of divided clocks $DC_1, DC_2, \ldots, DC_m$. The clock signal creation processor 67, for example, deletes the divided clock $DC_m$ selected from the plurality of divided clocks $DC_1, DC_2, \ldots, DC_m$. In this manner, in this preferred embodiment, the selected divided clock $DC_m$ may be deleted, so that the pulse period of the pulse $P_n$, to which the selected and deleted divided clock $DC_m$ belongs, is shortened from the pulse period $D_{1n}$ to the pulse period $D_{2n}$. As a result, the pulse period $D_{2n}$ of the pulse $P_n$ is made different from the other pulse periods. The resultant transfer clock signal CS2 has no specific frequency.

In this preferred embodiment, as shown in FIG. 8, the first period TD1, with which the time division is performed on the reference clock signal CS1, is shorter than each of the pulse periods $D_{11}, D_{12}, \ldots, D_{1n}$ of the reference clock signal CS1. Such an arrangement allows the pulses $P_1, P_2, \ldots, P_n$ to be divided. Therefore, at least one of the pulse periods of the pulses $P_1, P_2, \ldots, P_n$ is made different from the other pulse periods. Thus, the transfer clock signal CS1 having the radiation noise dispersed is easily created.

In this preferred embodiment, as shown in FIG. 6, the clock signal creation processor 67, for example, inserts a new divided clock $DC_{1'}$ after the divided clock $DC_1$ selected from the plurality of divided clocks $DC_1, DC_2, \ldots, DC_m$. The new divided clock $DC_1$ has a level that allows the level at the rear end of the divided clock $DC_1$ to be kept for the predetermined second period TD2. In this manner, in this preferred embodiment, the new divided clock $DC_{1'}$ is inserted after the selected divided clock $DC_1$, namely, between the divided clock $DC_1$ and the divided clock $DC_2$, so that the pulse period of the pulse $P_1$, to which the divided clock $DC_1$ belongs, is extended from the pulse period $D_{11}$ to the pulse period $D_{21}$. As a result, the pulse period $D_{21}$ of the pulse $P_1$ is made different from the other pulse periods. The resultant transfer clock signal CS2 has no specific frequency.

In this preferred embodiment, the length of the second period TD2, which is a period of the new divided clock $DC_{1'}$, is the same as the length of the first period TD1, with which the time division is performed on the reference clock CS1. The first period TD1 and the second period T2 are made the same, so that the process is prevented from being complicated and the processing time is shortened.

In this preferred embodiment, as shown in FIG. 8, the clock signal creation processor 67, for example, does not perform any process on the divided clock $DC_3$ selected from the plurality of divided clocks $DC_1, DC_2, \ldots, DC_m$. If either one of the process A of deleting the selected divided clock and the process B of inserting a new divided clock is performed on all the divided clocks $DC_1, DC_2, \ldots, DC_m$, the processing time is extended. In this preferred embodiment, the process C of not performing any process on the selected divided clock, for example, the divided clock $DC_3$, is provided. This shortens the processing time. Either one of the process A, the process B and the process C is performed on each of the divided clocks $DC_1, DC_2, \ldots, DC_m$. Therefore, as compared with the case where either one of the process A and the process B is performed, the pulse periods are made different more easily, like the pulse period $D_{21}, D_{22}, \ldots, D_{2n}$. Thus, the transfer clock signal CS2 having the radiation noise dispersed is created more easily.

In this preferred embodiment, the printing device 100 preferably is a so-called large-scale printer, for example. Herein, the length of the platen 25 in the main scanning direction Y preferably is about 20 cm or longer, for example. As the printer is larger, a higher-level electric current flows toward the ink heads 40. Therefore, the radiation noise is generated more easily. In this preferred embodiment, the transfer data generator 60 creates the transfer clock signal CS2 having no specific frequency, as the clock signal to be transferred to each of the ink heads 40. Therefore, even in such a large-scale printer, an increase in the level of the generated radiation noise is significantly reduced or prevented. Creation of such a transfer clock signal CS2 is especially useful for a large-scale printer.

As described above, the storage processor 61, the reference printing image data creation processor 63, the time division processor 65, the clock signal creation processor 67, the transfer printing image data creation processor 69, and the transmission processor 71 may be realized by software, for example. Namely, the above-listed processors may be realized by a computer that executes a computer program. Preferred embodiments of the present invention encompass a computer program that allows the computer to act as the above-listed processors. Preferred embodiments of the present invention encompass a recording medium readable by the computer on which the computer program is stored. The above-listed processors may be realized by one processor, or a plurality of processors, included in the transfer data generator 60. Preferred embodiments of the present invention encompass a circuit having the same function as that of the program executable by such processor(s). In this case, the storage processor 61, the reference printing image data creation processor 63, the time division processor 65, the clock signal creation processor 67, the transfer printing image data creation processor 69, and the transmission processor 71 may be respectively replaced with a storage circuit 61, a reference printing image data creation circuit 63, a time division circuit 65, a clock signal creation circuit 67, a transfer printing image data creation circuit 69, and a transmission circuit 71.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or referred to during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transfer data generator creating transfer data in a printing device,
    the printing device including:
        a platen that accommodates a recording medium thereon; and
        an ink head that ejects ink toward the recording medium on the platen;
    the transfer data including:
        transfer printing image data to be transferred to the ink head; and
        a transfer clock signal to be transferred to the ink head;
    the transfer data generator comprising:
        a storage processor having, stored thereon, a reference clock signal including a plurality of pulses with pulse periods of a same length as each other, and reference printing image data corresponding to the reference clock signal;
        a clock signal creation processor configured or programmed to make a pulse period of at least one pulse of the plurality of pulses of the reference clock signal different from each of pulse periods of the other pulses, and create the transfer clock signal from the reference clock signal;
        a printing image data creation processor configured or programmed to adjust the reference printing image data to correspond to the transfer clock signal created by the clock signal creation processor, to create the transfer printing image data; and
        a time division processor configured or programmed to divide the reference clock signal with a predetermined first period, and to divide the reference dock signal into a plurality of divided clocks; wherein
    when selecting a first selected divided clock from the plurality of divided clocks obtained by the time division processor, the clock signal creation processor deletes the first selected divided clock.

2. The transfer data generator according to claim 1, wherein the first period is shorter than the pulse period of each of the plurality of pulses of the reference clock signal.

3. The transfer data generator according to claim 1, wherein when selecting a second selected divided clock from the plurality of divided clocks obtained by the time division processor, the clock signal creation processor inserts a new divided clock after the second selected divided clock, the new divided clock having a level that allows a level at a rear end of the second selected divided clock to be kept for a predetermined second period.

4. The transfer data generator according to claim 3, wherein the second period has a same length as that of the first period.

5. The transfer data generator according to claim 1, wherein when selecting a third selected divided clock from the plurality of divided clocks obtained by the time division processor, the clock signal creation processor does not perform any process on the third selected divided clock.

6. A printing device, comprising:
    the transfer data generator according to claim 1;
    the platen; and
    the ink head.

7. The printing device according to claim 6, further comprising a transfer processor configured or programmed to transfer, to the ink head, the transfer clock signal created by the clock signal creation processor, and the transfer printing image data created by the printing image data creation processor.

8. The printing device according to claim 6, further comprising a movement mechanism that moves the ink head in a main scanning direction with respect to the platen; wherein
    the platen has a length in the main scanning direction of about 20 cm or longer.

9. A transfer data creation method for creating transfer data in a printing device,
    the printing device including:
        a platen that accommodates a recording medium thereon; and
        an ink head that ejects ink toward the recording medium on the platen;
    the transfer data including:
        transfer printing image data to be transferred to the ink head; and
        a transfer clock signal to be transferred to the ink head;
    the transfer data creation method comprising:
        a preparation step of preparing a reference clock signal including a plurality of pulses with pulse periods of a same length as each other, and reference printing image data corresponding to the reference clock signal;

a time division step of dividing the reference clock signal with a predetermined first period to divide the reference clock signal into a plurality of divided clocks;

a clock signal creation step of, when selecting a first selected divided clock from the plurality of divided clocks obtained in the time division step, deleting the first selected divided clock to create the transfer clock signal from the reference clock signal; and a printing image data creation step of adjusting the reference printing image data to correspond to the transfer clock signal created in the clock signal creation step, to create the transfer printing image data.

10. The transfer data creation method according to claim 9, wherein the clock signal creation step includes a step of, when selecting a second selected divided clock from the plurality of divided clocks obtained in the time division step, inserting a new divided clock after the second selected divided clock, the new divided clock having a level that allows a level at a rear end of the second selected divided clock to be kept for a predetermined second period.

11. The transfer data creation method according to claim 9, wherein the clock signal creation step includes a step of, when selecting a third selected divided clock from the plurality of divided clocks obtained in the time division step, not performing any process on the third selected divided clock.

* * * * *